United States Patent Office 2,801,619
Patented Aug. 6, 1957

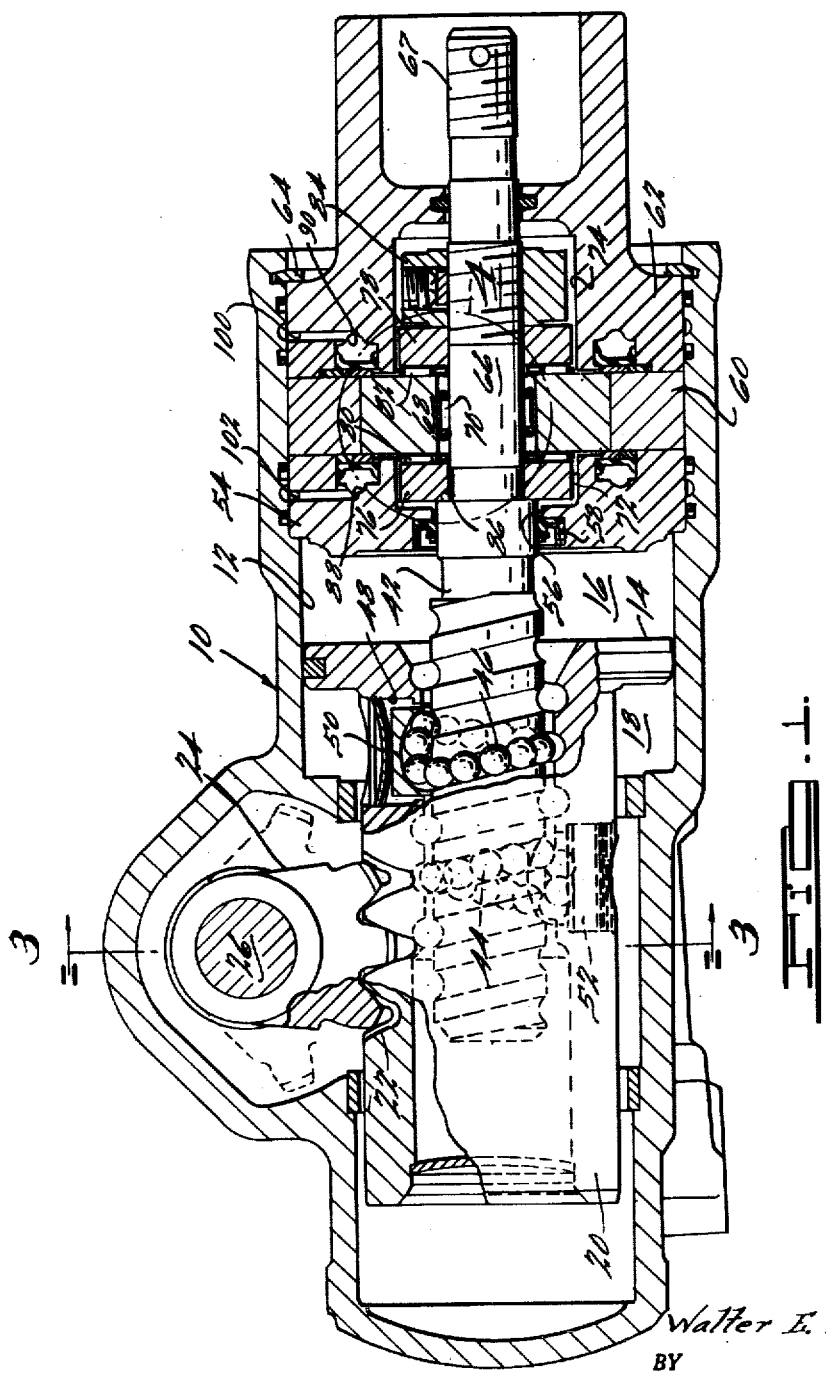

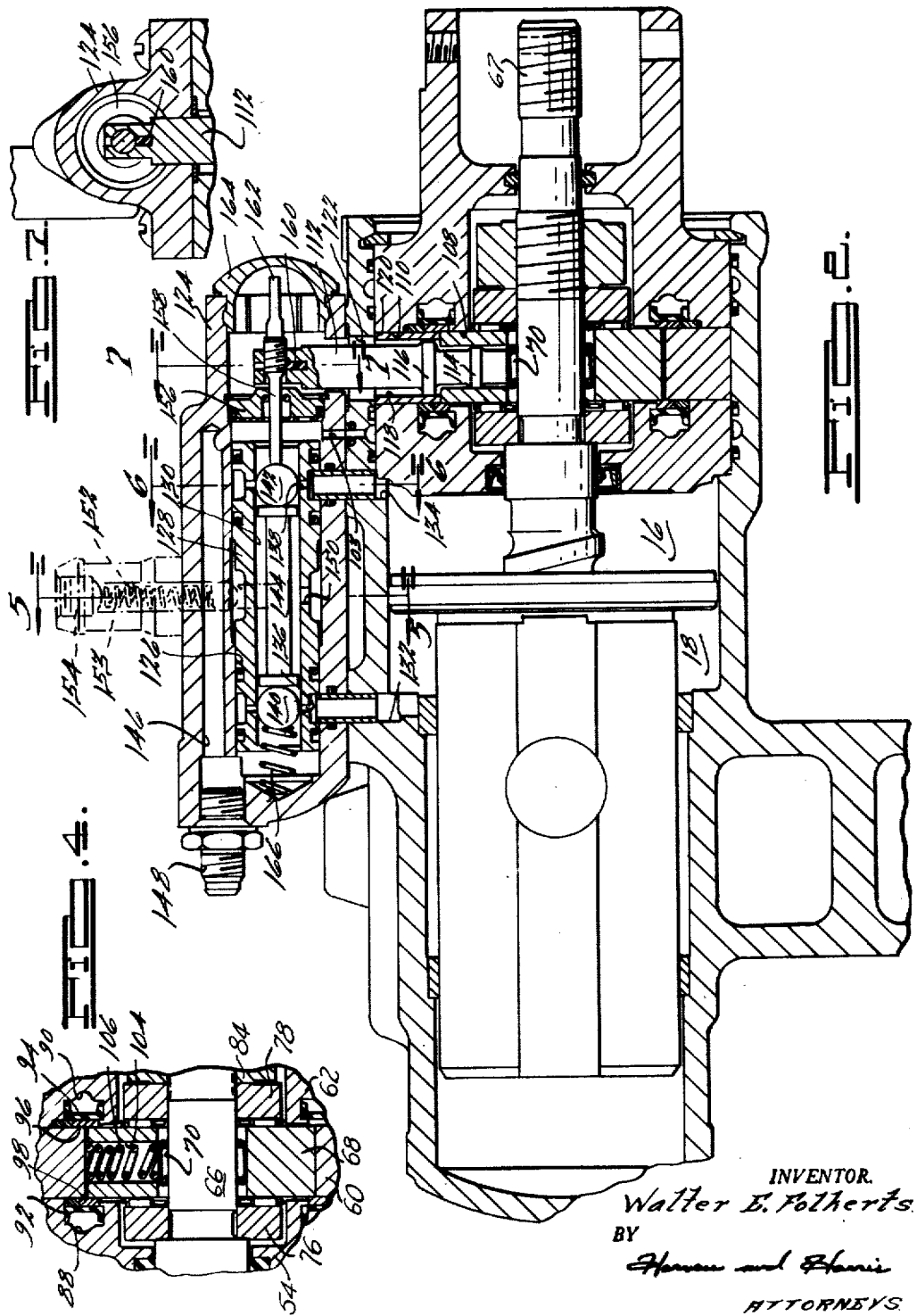

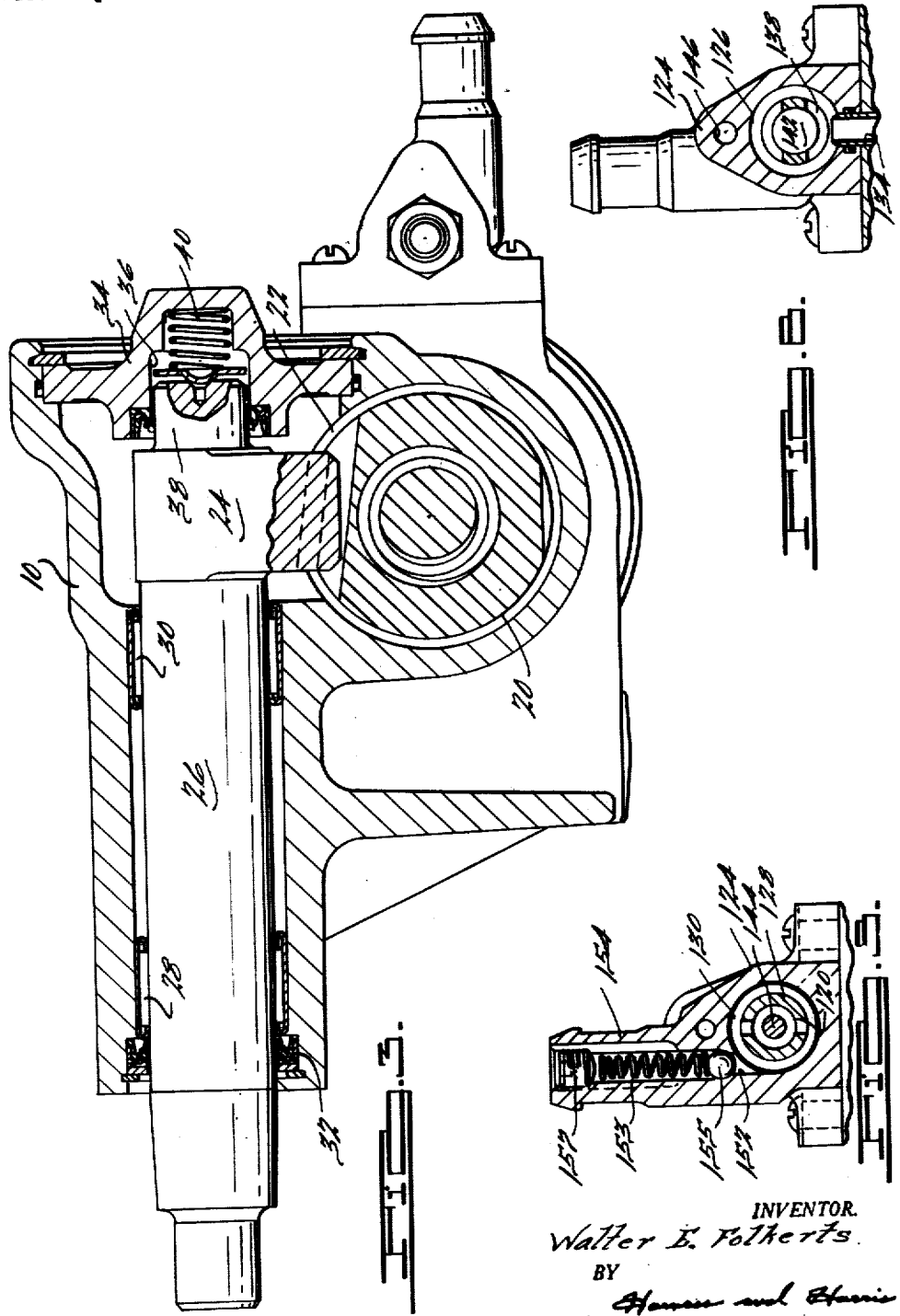

2,801,619

POWER STEERING UNIT HAVING SIMPLIFIED CONTROL VALVE

Walter E. Folkerts, Hazel Park, Mich., assignor to Chrysler Corporation, Highland Park, Mich., a corporation of Delaware Application September 12, 1955, Serial No. 533,799

4 Claims. (Cl. 121—46.5)

This invention relates generally to a fluid actuated power steering mechanism for motor vehicles or the like and more particularly to an improved control valve means for controlling the distribution of fluid pressure to a motor portion of the mechanism.

This application forms a continuation-in-part of my copending application Serial No. 523,603 filed July 21, 1955, and reference may be had thereto for the purpose of supplementing my instant disclosure. The fluid motor portion of the mechanism of my copending application has portions which are common to the mechanism presently disclosed and in general it comprises a cast housing forming a working cylinder which slidably receives a piston carrying a gear rack, said piston defining a pair of opposed working chambers. A piston shaft is threadably connected to the piston and it extends axially from one side of the piston. The piston shaft may slidably actuate the piston upon rotation thereof and it is adapted to undergo a limited amount of axial displacement in either direction from the neutral position as a turning effort is applied to the same. This axial movement is transmitted to a valve operating lever which may extend substantially in a radial direction from the center line of the cylinder to an externally situated control valve assembly. The control valve assembly has portions situated within a fluid pressure delivery passage means with branch portions extending to each of the working chambers. A portion of the steering mechanism may be drivably connected to the gear rack and as a manual turning effort is applied to the piston shaft, an axial force is transmitted to the piston and gear rack by reason of the threaded connection between the piston and the piston rod above mentioned. This axial force is accompanied by a shifting movement of the piston rod and the valve actuating lever which in turn actuates the control valve assembly to progressively restrict the branch fluid pressure passage extending to one working chamber while simultaneously accommodating the transfer of fluid pressure through the other branch pressure passage to the other working chamber.

According to a principal feature of my instant invention I have provided an improved valve mechanism of simplified construction for controlling the distribution of fluid pressure to either of the working chambers in response to a movement of the piston shaft as a steering torque is applied thereto in either direction during turning maneuvers of the vehicle.

The provision of an improved control valve assembly for use in combination with a power steering mechanism of the type above described being a principal object of my invention, it is another object of my invention to provide a power steering mechanism with a simplified control valve assembly having an instantaneous response to steering movements of the manually operable portions of the mechanism.

Another object of my invention is to provide a control valve assembly for use with a hydraulic power actuating mechanism which comprises valve components requiring a minimum of precision machining during manufacture and which is characterized by a low manufacturing cost.

Another object of my invention is to provide a valve assembly of the type above described which is relatively easy to assembly and to adjust after installation.

In carrying forth the foregoing objects I have provided a fluid motor of the piston and cylinder type having a control valve mechanism situated in a transverse position with respect to the axis of the cylinder. The control valve mechanism includes a relatively stationary hollow valve element which communicates through branch passages formed at axially spaced locations. The hollow interior of the stationary valve element is adapted to be connected to an exhaust conduit at a point intermediate the above-mentioned branch passages and spherical valve elements are situated within the interior of the stationary valve element for controlling the degree of communication between each of the branch passages and the hollow interior of the stationary valve element. A high pressure supply conduit communicates with either end of the stationary valve element and means may be provided for simultaneously displacing each of the spherical valve elements in an axial direction thereby increasing the degree of communication between one working chamber and the fuel pressure supply conduit while simultaneously exhausting the other working chamber. This creates a pressure differential across the piston and produces a power assist during the steering operation.

For the purpose of more particularly describing certain of the features of my instant invention, reference will be made to the accompanying drawings wherein:

Figure 1 is a longitudinal cross sectional view of the power steering mechanism embodying the improved valve construction of my instant invention;

Figure 2 is another longitudinal cross sectional view taken along a plane perpendicular of the plane of the cross section of Figure 1 and showing the details of the control valve mechanism of my instant invention;

Figure 3 is a transverse sectional view of the rack and pinion of the power boosting mechanism and is taken along section line 3—3 of Figure 1;

Figure 4 is a detail view showing the connection between the piston shaft and the valve actuating mechanism, the portion of the structure in Figure 1 corresponding to the structure of Figure 4 being encircled as indicated in Figure 1;

Figure 5 is a cross sectional view of the control valve mechanism illustrated in Figure 2 and is taken along section line 5—5 of Figure 2;

Figure 6 is another sectional view of the control valve mechanism of Figure 2 and is taken along section line 6—6 of Figure 2; and Figure 7 is a sectional view showing the connection between a movable portion of the valve mechanism with the valve actuating member and is taken along section line 7—7 of Figure 2.

Referring first to Figure 1, the numeral 10 is used to generally represent the cast housing of the power steering mechanism and by preference it is comprised of a one-piece construction as indicated. The housing 10 defines a cylindrical section 12 which slidably receives a piston member 14, the latter defining a pair of opposed working chambers 16 and 18. The piston 14 includes a hollow extension 20 upon which is formed a gear rack 22, said gear rack being operatively engaged with a sector gear 24 as indicated. The sector gear 24 is carried by and secured to a rocker shaft 26 which may be journalled as indicated in Figure 3 at spaced locations 28 and 30 in the cast housing 10. The rocker shaft 26 extends to the exterior of the housing 10 through a suitable sealing device 32 and is adapted to be positively connected to a steering linkage element of a vehicle steering mechanism. The housing 10 may include an aperture as seen in Figure 3, for receiving the rocker shaft 26 and the sector gear 24 during assembly, and this aperture may be closed by a closure element 34 having a central opening 36 for receiving a reduced diameter portion 38 of the rocker shaft 26. A spring 40 may be interposed between the closure element 34 and the reduced diameter shaft portion 38 for urging the teeth of the sector gear 24 and the teeth of the gear rack 22 into engagement, said teeth being tapered with a progressively varying tooth thickness to permit a positive driving engagement with zero backlash.

The piston 14 and the extension 20 are centrally apertured to receive an externally threaded piston shaft 42 and a portion of the extension 20 is internally threaded, the internal threads of the extension 20 cooperating with the external threads of the shaft 42 to define a spiral channel. A pair of spaced recirculating ball circuits are received within the spiral channel to effect a recirculating ball nut connection between the shaft 42 and the piston 14, said spaced ball circuits being identified in Figure 1 by numerals 44 and 46.

A radially extending opening 48 is formed in the vicinity of the ball circuit 46 and a bridge element 50 is received therein as shown. The bridge element 50 is formed with a crossover channel which receives the balls of the circuit 46 and transfers the same from one groove in the shaft 42 to an adjacent groove as the balls circulate about the axis of the shaft 42. Similarly, another bridge element shown at 52 is provided for the ball circuit 44 and it is adapted to transfer the balls of the circuit 44 from one groove to the other to effect a closed circuit as in the previous case.

The open end of the casing 10 receives a transverse wall member 54 having a central opening 56 for receiving the extended end of the shaft 42, a suitable seal 58 being provided at this location to prevent leakage of fluid from the working chamber 16. A circular spacer 60 is situated adjacent wall member 54 and a second wall member 62 is positioned against the spacer 60 and held in place by a snap ring 64.

The shaft 42 includes a reduced diameter section 66 extending through the wall member 64 and it is adapted to be connected at its end 67 to a personally operable steering shaft. The reduced diameter shaft section 66 carries an adaptor 68 which may be journalled on the shaft section 66 by a suitable needle bearing 70 as best seen in Figure 4. The wall members 54 and 62 are recessed at 72 and at 74 respectively, for receiving the backup rings 76 and 78. Radial needle bearings 80 and 82 are respectively interposed between the backup ring 76 and the adaptor 68 and between the backup ring 78 and the adaptor 68. A nut element 84 is threadably received on the shaft section 66 for fixing the axial position of the backup ring 78. A shoulder 86 is formed on the shaft section 66 for the purpose of engaging the backup ring 76 and for maintaining the adaptor 68 and the adjacent backup rings 76 and 78 in axially stacked relationship.

As best seen in Figure 4, a clearance is provided between the adaptor 68 and the adjacent wall members 54 and 62 for the purpose of accommodating a slight shifting movement between the shaft 42 and the adaptor 68 with respect to the relatively stationary wall members 54 and 62. For the purpose of opposing the relative shifting movement between the shaft 42 and the wall members 54 and 62 a circular reaction chamber is formed in each of the wall members as indicated at 88 and at 90, said reaction members encircling the axis of the shaft 42. A circular seal is situated within each of the reaction chambers 88 and 90 as indicated at 92 and at 94 respectively. A reaction ring 96 overlaps the spacer 60 and the adaptor 68 and it is engaged by a central portion of the seal 94. Similarly, a reaction ring 98 is positioned against the center portion of the seal 92 in overlapping engaged relationship with respect to the spacer 60 and the adaptor 68. Fluid pressure may be conducted to the reaction chambers 88 and 90 through suitable branch passages shown in part in Figure 1 at 102 and 100 respectively, and said branch passages communicating with a pressurized passage 103 as best seen in Figure 2. The hydraulic pressure exerted on the reaction rings 96 and 98 oppose any relative shifting movement between the shaft 42 and the relatively stationary wall members 54 and 62.

As best seen in Figure 4, the adapter 68 is formed with a radial opening 104 in which is positioned a spring 106 for urging the shaft 42 in a transverse direction thereby loading the recirculating ball nut connection between the shaft 42 and the piston 14, said spring being seated on the bearing race for the needle bearing 70. The transverse force exerted on the shaft 42 is balanced by a force couple acting through the spaced pair of recirculating ball circuits and the existence of this force couple tends to prevent any free play or looseness in the threaded connection between the shaft 42 and the piston 14.

The adaptor 68 and the spacer 60 are formed with aligned radial openings 108 and 110 respectively which receive the valve actuator lever best seen in Figure 2 at 112. The lever 112 may be seated on the bearing race of the needle bearing 70 and it may be provided with a shoulder 114 which engages the sides of the radial opening 108. Another enlarged shoulder 116 may be formed on the lever 112 to provide a pivot for the same, said shoulder 116 engaging spacers 118 and 120.

The lever 112 extends radially outward of the casting 10 through an opening 122 and into the interior of a valve housing 124 secured to one side of the casting housing 10. The valve housing 124 is comprised of a longitudinal bore 126 within which is received a stationary valve sleeve 128 having a hollow interior 130. A pair of passages 132 and 134 extend from the working chambers 18 and 16 respectively, into the bore 126. The valve sleeve 128 is formed with spaced ports 136 and 138 which respectively communicate with the branch passages 132 and 134. A first spherical ball valve element 140 is positioned within the interior 130 of the valve sleeve 128 in registry with the ports 136 and a second valve element 142 is similarly positioned with respect to the ports 138. The spacer member 144 is interposed between the ball valve elements 140 and 142 for maintaining a fixed spacing between the same.

The valve housing 124 is provided with a fluid pressure supply passage 146 which extends to one side of the stationary valve element 128 as indicated. The passage 146 may be connected to a fluid pressure fitting 148 to accommodate a connection with a suitable pressure conduit. Fluid pressure may be directed to the other side of the stationary valve element 128 by reason of the direct connection between the left end of the bore 126 with the passage 146.

An exhaust conduit may also be formed in the valve housing 124 and it may communicate with a series of ports 150 situated in the stationary valve element 128 intermediate the ports 136 and 138. This exhaust conduit is represented in Figure 2 by means of phantom lines and is designated by numeral 152. A suitable fitting 154 may be formed on the end of the exhaust conduit 152 to facilitate a connection with a suitable low pressure exhaust line. This fitting 154 has been illustrated in Figure 5 in more particular detail and as thus seen in Figure 5, it may be adapted to receive a spring loaded check valve 155 for providing a back pressure in the exhaust conduit 152. This back pressure check valve includes a spring 153 which may be seated on a threaded element 157. The element 157 may be adjustably positioned for the purpose of varying the spring tension of the spring 153.

The end of the bored opening 126 may be closed by a closure member 156 having a central opening which receives a valve shifter 158, said valve shifter being threadably connected to the end of the lever 112. A nylon inert 160 may be positioned adjacent the threaded connection between the shifter 158 of the lever 112 to prevent relative movement between the members. The shifter 158 may be formed with an extension 162 to facilitate an axial adjustment of the same, and the housing 124 may be provided with a suitable cap 164 which may be removed to make the extension 162 accessible.

The ball valve elements 140 and 142 may be urged in a right hand direction as viewed in Figure 2, by a spring 166 interposed between the ball valve element 140 and the end of the bored opening 126. It is thus apparent that the valve shifter 158 and the spring 166 are adapted to position the ball valve elements 140 and 142 with respect to their associated valve ports.

During operation of the mechanism above described, a steering effort may be applied to the shaft 42 by the vehicle operator and this torque may be translated into an axial force on the piston 14 by reason of the threaded connection between the shaft 42 and the piston 14. As the piston 14 is urged in a left hand direction as viewed in Figure 1, the force reaction causes the shaft 42 to shift slightly to the right and this axis shifting movement is transmitted to the lever 112 by reason of the connection between the lower end of the lever 112 and the reduced diameter portion 66 of the shaft 42 above described. This causes the lever 112 to pivot about the shoulder 116 in a counterclockwise direction as viewed in Figure 2, thereby causing the shifter element 158 to move to the left which in turn causes the ball valve elements 140 and 142 to become displaced in a left hand direction. High pressure fluid is then caused to pass from the conduit 146 through the ports 138 and the passage 134 into the working chamber 16. Simultaneously the fluid within the working chamber 18 will become exhausted through the passage 132, through the ports 136, through the interior 130 of the fixed valve element 128 and through the communicating exhaust conduit 152. It is thus apparent that a pressure differential will be produced across the piston 14 thereby exerting a hydraulic force on the same in a left hand direction to supplement the personally applied steering effort.

Upon movement of the shaft 42 in the opposite direction, the shaft 42 and the lever 112 will be shifted to the opposite direction thereby enabling the spring 166 to displace the ball valve elements 140 and 142 in the right hand direction. This increases the degree of communication between the working chamber 18 and the pressure supply conduit 146 while simultaneously exhausting the fluid from the chamber 16 through the exhaust conduit 152.

A pressure buildup in either of the working chambers occurs simultaneously with a pressure buildup in the supply conduit 146 and in the region at the right end of the valve element 128. The passage 103 communicates with this region thereby accommodating the transfer of fluid pressure to the reaction chambers.

When no steering effort is applied to the shaft 42, the ball valve elements 140 and 142 will resume the central neutral position and the high pressure fluid from the conduit 146 will bypass each of the ball valve elements 140 and 142 and enter the exhaust circuit without creating a pressure unbalance in the working chambers 16 and 18. I contemplate that the pressurized fluid will continuously circulate throughout the system and that any displacement of the ball valve elements will be immediately accompanied by a pressure buildup on the high pressure side of the valve mechanism. The power assist is therefore available at all times regardless of the magnitude of the steering effort and the ratio of the magnitudes of the power assist and the personally applied steering effort is substantially constant under all normal operating conditions.

The elements of the control valve assembly require little or no high precision machining during manufacture and it is more sensitive than many spool-type valves of known construction. A smooth and instantaneous pressure buildup is produced in the working chambers by reason of the increased sensitivity of the valve mechanism.

I claim:

1. In a valve mechanism for a fluid actuated device, conduit means for supplying said device with working pressure, a valve chamber disposed in said conduit means forming a portion of the same, said conduit means including a pair of branch passages extending from said valve chamber at spaced locations, a pair of spherical valve elements in said valve chamber and registering with said branch passages respectively, a valve spacer member disposed between said valve elements, spring means for urging said valve elements and said spacer in one direction, a personally operable valve actuator member contacting one of said valve elements for restraining movement of said valve elements and said spacer member in said one direction and being shiftable in said one direction and in the opposite direction to control the degree of communication between said valve chamber and said branch passages.

2. In a valve mechanism for a fluid actuated device, fluid pressure supply conduit means having a pair of separate conduit portions for supplying working pressure to said device, an elongated valve chamber, said conduit portions communicating with said valve chamber at spaced locations, a pair of spherical valve elements situated within said valve chamber, a separate one of said valve elements registering with each of said conduit portions for controlling the degree of communication between said chamber and said conduit portions, a spacer member situated between said valve elements for maintaining the latter in fixed spaced relationship, spring means for urging said valve elements and said spacer member in one direction, and a valve actuator member contacting one of said valve elements for restraining movement of the same in said one direction and for displacing said valve elements with respect to said conduit portions to selectively distribute fluid pressure thereto.

3. In a valve mechanism for a fluid actuated device, an elongated valve chamber, a pair of spherical valve elements situated within said valve chamber in spaced relationship, a first fluid conduit communicating with said valve chamber intermediate said valve elements, a second fluid conduit communicating with opposite ends of said valve chamber, one of said conduits being a pressure conduit and the other of said conduits being an exhaust conduit, a pair of branch passages extending from said valve chamber for supplying said device with working pressure, each of said valve elements registering at a centered position with one of each of said passages for controlling the degree of communication between said chamber and said branch passages, a spacer member situated between said valve elements for maintaining the latter in fixed spaced relationship, spring means for biasing said valve elements and spacer member in one direction, and valve actuator means for adjustably positioning said spacer member and valve elements with respect to said branch passages to selectively distribute fluid pressure thereto, said spherical valve elements closely engaging the walls of said chamber to restrict passage of fluid between said elements and walls when said elements are displaced from said centered position and being effective at said centered position to enable passage of fluid between said walls and elements at the regions of said branch passages.

4. In a valve mechanism for a fluid actuated device, an elongated valve chamber, a pair of spherical valve elements situated within said valve chamber in spaced relationship, a first fluid conduit communicating with said valve chamber intermediate said valve elements, a second fluid conduit communicating with opposite ends of said valve chamber, one of said conduits being a pressure conduit and the other of said conduits being an exhaust conduit, a pair of branch passages extending from said valve chamber for supplying said device with working pressure, each of said valve elements registering at a centered position with one of each of said passages for controlling the degree of communication between said chamber and said branch passages, a spacer member situated between said valve elements for maintaining the latter in fixed spaced relationship, spring means engaging one of said valve elements for biasing said valve elements and spacer member in one direction, and valve actuator means engaging the other of said valve elements in opposition to the tension of said spring means for adjustably positioning said spacer member and valve elements with respect to said branch passages to selectively distribute fluid pressure thereto, said spherical valve elements closely engaging the walls of said chamber to restrict passage of fluid between said elements and walls when said elements are displaced from said centered position and being effective at said centered position to enable passage of fluid between said walls and elements at the regions of said branch passages.

References Cited in the file of this patent

UNITED STATES PATENTS

| | | |
|---|---|---|
| 1,830,211 | Roberts | Nov. 3, 1931 |
| 2,054,464 | Johnson | Sept. 15, 1936 |
| 2,362,930 | Robbins | Nov. 14, 1944 |
| 2,596,242 | Hill | May 13, 1952 |
| 2,682,778 | Creson et al. | July 6, 1954 |

UNITED STATES PATENT OFFICE

CERTIFICATE OF CORRECTION

Patent No. 2,801,619                                         August 6, 1957

Walter E. Folkerts

It is hereby certified that error appears in the printed specification of the above numbered patent requiring correction and that the said Letters Patent should read as corrected below.

Column 5, line 2, for "inert" read -- insert --; line 23, for "axis" read -- axial --; line 45, for "shifted to" read -- shifted in --.

Signed and sealed this 1st day of October 1957.

(SEAL)

Attest:

KARL H. AXLINE

Attesting Officer

ROBERT C. WATSON
Commissioner of Patents